United States Patent
Nádas et al.

(10) Patent No.: US 9,137,703 B2
(45) Date of Patent: Sep. 15, 2015

(54) TECHNIQUE FOR HANDLING A DATA PACKET STREAM

(71) Applicant: Telefonaktiebolaget L M Ericsson (publ), Stockholm (SE)

(72) Inventors: Szilveszter Nádas, Budapest (HU); Sándor Rácz, Cegléd (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 101 days.

(21) Appl. No.: 13/937,656

(22) Filed: Jul. 9, 2013

(65) Prior Publication Data

US 2014/0016460 A1 Jan. 16, 2014

(30) Foreign Application Priority Data

Jul. 10, 2012 (EP) .................................... 12005088

(51) Int. Cl.
*H04W 28/02* (2009.01)
*H04L 1/18* (2006.01)
*H04L 1/00* (2006.01)

(52) U.S. Cl.
CPC ......... *H04W 28/0289* (2013.01); *H04L 1/1838* (2013.01); *H04L 1/0002* (2013.01); *H04L 2001/0093* (2013.01)

(58) Field of Classification Search
CPC . H04W 28/00; H04W 28/02; H04W 28/0205; H04W 28/0273; H04W 28/0284; H04W 28/0289; H04W 28/04; H04W 28/10; H04W 72/02; H04W 72/04; H04W 72/0406; H04W 72/12; H04L 1/1838; H04L 1/0002; H04L 2001/0093
See application file for complete search history.

(56) References Cited

U.S. PATENT DOCUMENTS

| | | | |
|---|---|---|---|
| 2002/0001287 A1 | 1/2002 | Bergenwall et al. | |
| 2002/0191594 A1 | 12/2002 | Itoh et al. | |
| 2006/0251007 A1* | 11/2006 | Pragada et al. | 370/328 |
| 2008/0209297 A1 | 8/2008 | Chandra et al. | |
| 2008/0298332 A1* | 12/2008 | Erami | 370/338 |
| 2012/0099510 A1* | 4/2012 | Kim et al. | 370/312 |
| 2014/0301223 A1* | 10/2014 | Wong et al. | 370/252 |

* cited by examiner

*Primary Examiner* — Anh Ngoc Nguyen
(74) *Attorney, Agent, or Firm* — Murphy, Bilak & Homiller, PLLC

(57) ABSTRACT

A method of handling a data packet stream at different communication protocol layer levels of a communication protocol layer stack of an UMTS communication device is provided. The method comprises: Receiving a data packet stream at the communication device; Determining whether, in case of a loss of a data packet of the data packet stream, it is possible to retransmit the lost data packet to the communication device; and immediately transmitting data packets of the data packet stream succeeding the lost data packet from a MAC protocol layer level to a RLC protocol layer level if it is determined that the lost data packet cannot be retransmitted to the communication device, and otherwise storing data packets of the data packet stream succeeding the lost data packet for a third period of time at the MAC protocol layer level, which third period of time is longer than the second time period.

13 Claims, 9 Drawing Sheets

TECHNIQUE FOR HANDLING A DATA PACKET STREAM

RELATED APPLICATIONS

This application claims the benefit of and priority to European Application Serial No. 12005088.5, filed 10 Jul. 2012. The entire contents of said European Application are incorporated herein by reference.

TECHNICAL FIELD

The present disclosure relates to a method of handling a data packet stream at different communication protocol layer levels of a communication protocol layer stack of an UMTS communication device. Further, the invention relates to an UMTS communication device.

BACKGROUND

Wireless communications networks developed according to the $3^{rd}$-Generation Partnership Project (3GPP) specifications for the Universal Mobile Telecommunications System (UMTS) are known and have been deployed. Examples include Wideband Code Division Multiple Access ("WCDMA") UMTS communication networks, which usually comprise a plurality of Radio Network Controllers ("RNC"), each of the Radio Network Controllers being connected to a plurality of base stations (radio transceivers), also called Node Bs, via a corresponding Transport Network ("TN"). The Radio Network Controllers are connected with each other via a core network. The Node Bs communicate wirelessly with communication devices (also called User Equipment ("UE")).

In an UMTS communication network, congestion events often occur. Congestion events are, for example, a loss of a data packet or a delay of a data packet sent from a first component of the UMTS communication network to a second component of the UMTS communication network. Congestion events must be resolved in order to ensure a high performance of the UMTS communication network.

Accordingly, is desirable to improve the efficiency of UMTS communication networks or other communication networks having similar functionality with respect to handling congestion events.

SUMMARY

According to some embodiments of the present invention, a method of handling a data packet stream at different communication protocol layer levels of a communication protocol layer stack of an UMTS communication device is provided. The communication protocol layer stack comprises a Medium Access Control ("MAC") protocol layer and a Radio Link Control ("RLC") protocol layer. The method comprises receiving a data packet stream at the communication device. In the event of a loss of a data packet of the data packet stream, it is determined whether it is possible to retransmit the lost data packet to the communication device. If it is determined that the lost data packet cannot be retransmitted to the communication device, data packets of the data packet stream succeeding the lost data packet are immediately, upon receipt, transmitted from the MAC protocol layer level to a RLC protocol layer level. Otherwise, if it is determined that the lost data packet can be retransmitted to the communication device, the data packets succeeding the lost data packet of the data packet stream are stored for a predetermined period of time at the MAC protocol layer level, and then all data packets stored in the meantime are transmitted from the MAC protocol layer level to the RLC protocol layer level.

In other words, in the event of a data packet loss, it is determined whether it is possible to retransmit, i.e., to again receive the lost data packet. If this is not possible, then initiating and waiting for retransmission of the lost data packet, as implemented in current solutions, does not make any sense. As a consequence, if retransmission is not possible, such a waiting process is skipped. Skipping the waiting process means that all data packets of the data packet stream succeeding the lost data packet are immediately transmitted from the MAC protocol layer level to a RLC protocol layer level, as soon as they are received at the MAC protocol layer level. In contrast, in current solutions, all data packets of the data packet stream succeeding the lost data packet are stored at the MAC protocol layer level (e.g., in a reordering buffer of the MAC protocol layer) during a predetermined period of time, the start of which is triggered by the detection of the loss of the data packet (congestion event). By using the presently disclosed techniques, the speed of forwarding of the data packets from the MAC protocol layer level to the RLC protocol layer level can be increased, i.e., the efficiency of handling congestion events is increased.

In the context of aspects of the present invention, "immediately" transmitting a data packet from the MAC protocol layer level to the RLC protocol layer level means that the time period between reception of the data packet at the MAC protocol layer level and reception of the data packet at the RLC protocol layer level is less than the time period between reception of two succeeding data packets at the MAC protocol layer.

In order to determine whether a lost data packet can be retransmitted to the communication device, the cause or the area of the data loss may be examined. For example, if it is determined that the data packet has been lost over a Transport Network TN ("TN loss"), i.e., between a RNC and a Node B, then it may be decided that the lost data packet cannot be retransmitted to the communication device since, in current UMTS solutions, no mechanism for retransmission is available for TN loss. In contrast, for example, if it is determined that the data packet has been lost over an Uu interface ("Uu loss"), i.e., between a Node B and a UE, then it may be decided that the lost data packet can be retransmitted to the communication device since, in current UMTS solutions, a mechanism for retransmission is available for Uu loss.

To determine whether the data packet has been lost over a Transport Network (TN loss), it may be determined whether there is a gap in sequence numbers of data packets of the data packet stream at the MAC protocol layer level (i.e., a gap in sequence numbers "TSN"), and whether there is a gap in sequence numbers of the data packets of the data packet stream at a Tub Frame Protocol (FP) protocol layer level of the communication protocol layer stack. If these two conditions are fulfilled, there is a data packet loss over the Transport Network TN (TN loss). An advantage of this approach is that no additional functionality is needed since these sequence numbers are available in UMTS standard communication mechanisms.

In order to determine whether the data packet has been lost over a Uu interface, it may be determined whether there is a gap in sequence numbers of data packets of the data packet stream at the MAC protocol layer level, and whether there is not a gap in sequence numbers of the data packets of the data packet stream at the Iub FP protocol layer level. If these two conditions are fulfilled, there is a data packet loss over the Uu interface (Uu loss).

Congestion events (e.g., a data packet loss) and congestion actions (e.g., the decision to immediately forward received data packets of the data packet stream succeeding the lost data packet from the MAC protocol layer to the RLC protocol layer) related to the UMTS communication device may be monitored/controlled by an Active Queue Management (AQM)-based control mechanism, in particular by an Enhanced UpLink (EUL) AQM-based control mechanism provided within the UMTS communication device. The embodiments described above and below are particularly advantageous if AQM-based control mechanisms like EUL AQM-based control mechanisms are used.

In the event of determining that a lost data packet cannot be retransmitted (e.g., in case of a TN loss), it may be determined whether a data packet immediately succeeding the lost data packet includes only a RLC STATUS message. In this case, it may be waited until a data packet including RLC payload data (i.e., a "RLC DATA PDU" data packet) is received at the UMTS communication device before triggering a congestion action regarding the lost data packet. Determining whether a data packet immediately succeeding the lost data packet includes only a RLC STATUS message may be done at the MAC layer level. Determining whether a data packet including RLC payload data is received also may be done at the MAC layer level. In this scenario, a possible congestion action is to skip the lost data packet at the RLC layer level, i.e., to inform the RLC protocol layer that the RLC protocol layer does not have to wait for the lost data packet. In this way, it can be ensured that the skipping process at the RLC layer level works properly: In the event that a data packet immediately succeeding the lost data packet includes only a RLC STATUS message, current UMTS mechanisms may have problems in the skipping process at the RLC layer level, leading to an unnecessary waste of computational resources.

In the event of determining that a lost data packet cannot be retransmitted (e.g., in the event of a TN loss), it may be determined whether currently a retransmission process of a lost data packet which can be retransmitted to the communication device is already carried out, i.e., is ongoing. Should this be the case, it may be waited until the retransmission process has been finished or terminated before a congestion action is triggered with respect to the lost data packet that cannot be retransmitted. In this way, it can be prevented that, in the event of an ongoing retransmission process during a data packet loss, a plurality of data packets succeeding the lost data packet are lost when transmitting them from the MAC protocol layer to the RLC protocol layer, which would be the case due to current UMTS mechanisms. This approach in particular works for the case where the retransmission process is a Hybrid Automatic Repeat Request ("HARQ") retransmission process. The congestion action may for example be to skip the lost data packet which cannot be retransmitted at the RLC layer level.

The MAC layer may for example be a MAC-es layer. The UMTS device may for example be a RNC device.

Embodiments of the present invention include a computer program product comprising program code portions for performing the steps of any one of the embodiments of the present invention when the computer program product is run on a computer system. The computer program product may be stored on a non-transitory computer-readable recording medium.

According to some embodiments of the invention, an UMTS communication device is provided, comprising a communication protocol layer stack adapted to handle a data packet stream sent to the communication device at different communication protocol layer levels. The communication protocol layer stack comprises a MAC protocol layer and a RLC protocol layer. The communication device further comprises a receiving circuit adapted to receive a stream of data packets sent to the communication device, and a determining circuit coupled to the receiving circuit and adapted to determine whether, at a MAC protocol layer level, in case of a loss of a data packet of the data packet stream it is possible to retransmit the lost data packet to the communication device. The communication protocol layer stack is adapted to immediately transmit data packets of the data packet stream succeeding the lost data packet from the MAC protocol layer level to a RLC protocol layer level if it is determined by the determining circuit that the lost data packet cannot be retransmitted to the communication device.

The communication protocol layer stack may be further adapted to store data packets succeeding the lost data packet of the data packet stream for a predetermined period of time at the MAC protocol layer level if it is determined that the lost data packet can be resent to the communication device, and to then transmit all stored data packets from the MAC protocol layer level to the RLC protocol layer level.

BRIEF DESCRIPTION OF THE DRAWINGS

In the following, the present disclosure will be described in more detail with reference to exemplary embodiments illustrated in the drawings, wherein.

DETAILED DESCRIPTION

Figure 1:
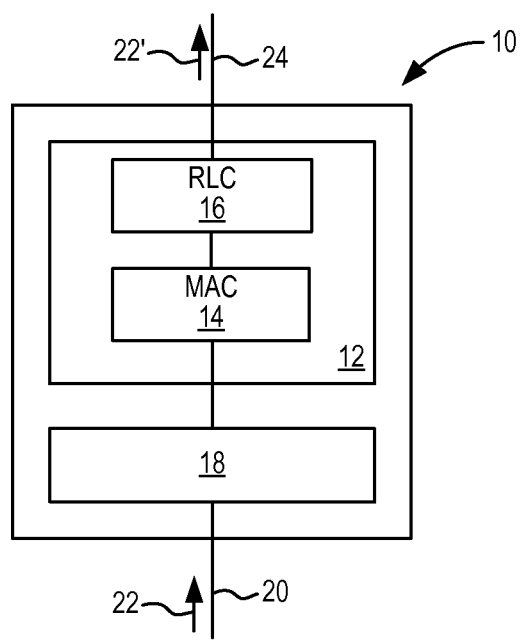
FIG. 1 shows a schematic drawing of a device according to an aspect of the present invention.

In the following description, for purposes of explanation and not limitation, specific details are set forth, such as specific device and system configurations and specific methods, steps and functions, in order to provide a thorough understanding of the technique presented herein. It will be appreciated that this technique may be practiced in other embodiments that depart from these specific details.

Those skilled in the art will further appreciate that the methods, steps and functions described herein may be implemented using individual hardware circuitry, using software functioning in conjunction with a programmed microprocessor or general purpose computer, using one or more Application Specific Integrated Circuits (ASICs), one or more DSPs and/or one or more Field Programmable Gate Arrays (FPGAs). It will also be appreciated that the technique disclosed herein may be embodied in a processor and a memory coupled to the processor, wherein the memory stores one or more programs that perform the methods, steps and functions de-scribed herein when executed by the processor.

With respect to the following embodiments, the same reference numerals are used to denote the same or similar components.

In WCDMA (Wideband Code Division Multiple Access) Radio Access Networks, the RNC and the Node-Bs are connected via a Transport Network (TN). In some cases, the Transport Network is a potential bottleneck, i.e., prone to TN congestion events. Without handling TN congestion events, application level throughput and delay degradation may occur. Thus, the bottleneck in the Transport Network can cause unwanted and unnecessary application level degradation. Thus, TN congestion control is necessary.

TN congestion control generally comprises a TN congestion event detection process and a congestion action process. The TN congestion event can be detected by observing a data packet flow between a RNC and Node-Bs, for example. For instance, a TN loss can be considered as a TN congestion event, which can be identified based on a gap in Tub FP sequence numbers, or based on time-stamps added to Tub FP data packets (frames). However, a delay of data packets also can be considered as a TN congestion event. The TN congestion event may also be detected by the TN itself and signaled to a RNC or to Radio Access Network ("RAN") nodes by using e.g., an Explicit Congestion Notification ("ECN") mechanism. Once the TN congestion event has been detected, a congestion action has to be initiated in order to resolve it.

To resolve congestion caused by the TN congestion event, the load of the congested part of the TN may be reduced, i.e., the final result of the action may be a reduced bitrate. For example, when the TCP protocol layer detects that a TCP segment (data packet) is missing (congestion event), then the TCP protocol layer may reduce (as a congestion action) a congestion window ("cwnd"), resulting in that the bitrate of the TCP protocol layer flow will be smaller (consequence of the congestion action).

The TN congestion action may be a rate-based congestion control that reacts to the congestion event directly with bitrate reduction to resolve the congestion. After having resolved the congestion, the bitrate may be gradually increased again. The bitrate may for example be modified by sending Absolute or Relative Grants to the UE. For this purpose, a shaper may be used at a transmitter side, i.e., at the UE.

According to embodiments of the present invention, application level TCP may be reused to handle TN congestion. That is, the TCP protocol layer of the communication protocol layer stack may decrease the bitrate of the TCP flow by modifying e.g., the congestion window (cwnd) TCP internal variable. The details of the congestion action may depend on the TCP version used.

As already indicated above, TN congestion may be detected based on gaps in sequence numbers of the corresponding protocol layers. After having detected a TN congestion event, the TCP protocol layer may be informed about the congestion event, in order to trigger the TCP protocol layer to carry out the congestion action (e.g., reducing the cwnd). "Informing" the TCP protocol layer of the congestion event may be done in an active way or in a passive way. Passive informing may mean that, in case that the RLC protocol layer does not do retransmission for a lost packet over TN (i.e., the RLC protocol layer "skips" the lost data packet), which results in a gap of RLC sequence numbers, the TPC protocol layer itself recognizes a resulting gap in TCP sequence numbers (i.e., the TPC protocol layer will see that an IP packet is missing).

Embodiments of the present invention can in particular prevent, in the case of using EUL, unwanted interaction between MAC-es and RLC protocol layers, which could cause performance degradation.

In the scope of the present invention, the term "data packet loss" includes both the case that a data packet which has been emitted from the UE will never arrive at the RNC, and the case that a data packet which has been emitted from the UE arrives at the RNC, however with delay. In the latter case, time-out mechanisms may be used in order to determine whether a delayed data packet is to be handled as a delayed data packet or as a lost data packet. For example, data packets arriving at the RNC with a delay larger than a particular threshold value may be regarded as time out data packets and thus be handled as lost data packets.

FIG. 1 shows an UMTS communication device 10 according to an aspect of the present invention. The UMTS communication device 10 comprises a communication protocol layer stack 12 adapted to handle a data packet stream 22 sent to the communication device 10 at different communication protocol layer levels. The communication protocol layer stack 12 comprises a MAC protocol layer 14 and a RLC protocol layer 16. The communication device 10 further comprises a receiving circuit 18 adapted to receive the data packet stream 22 sent to the communication device 10 via an input terminal 20, and a determining circuit (not shown) coupled to the receiving circuit 18 and adapted to determine whether, in case of a loss of a data packet of the data packet stream 22 it is possible to retransmit the lost data packet to the communication device 10. The communication protocol layer stack 12 is adapted to immediately transmit data packets of the data packet stream succeeding the lost data packet from a level of the MAC protocol layer 14 to a level of the RLC protocol layer 16 if it is determined by the determining circuit that the lost data packet cannot be retransmitted to the communication device 10. The communication protocol layer stack 12 may be further adapted to store data packets succeeding the lost data packet of the data packet stream for a predetermined period of time at the level of the MAC protocol layer 14 if it is determined that the lost data packet can be resent to the communication device 10, and then to transmit all stored data packets from the level of the MAC protocol layer 14 to the level of the RLC protocol layer 16. The determining circuit may for example be located within the communication protocol layer stack 12 (i.e., form a part of the functionality of the communication protocol layer stack 12), e.g., in the MAC protocol layer 14, or outside the communication protocol layer stack 12. For reasons of simplicity, only the MAC protocol layer 14 and the RLC protocol layer 16 are shown in the communication protocol layer stack 12. Of course, the communication protocol layer stack 12 may comprise additional communication protocol layers, such as TCP/IP protocol layers. A processed data packet stream 22' is outputted from the communication device 10 via an output terminal 24, after having been routed through the communication protocol layer stack 12. The communication device 10 may be a Radio Network Controller ("RNC") device, for example.

Figure 2:
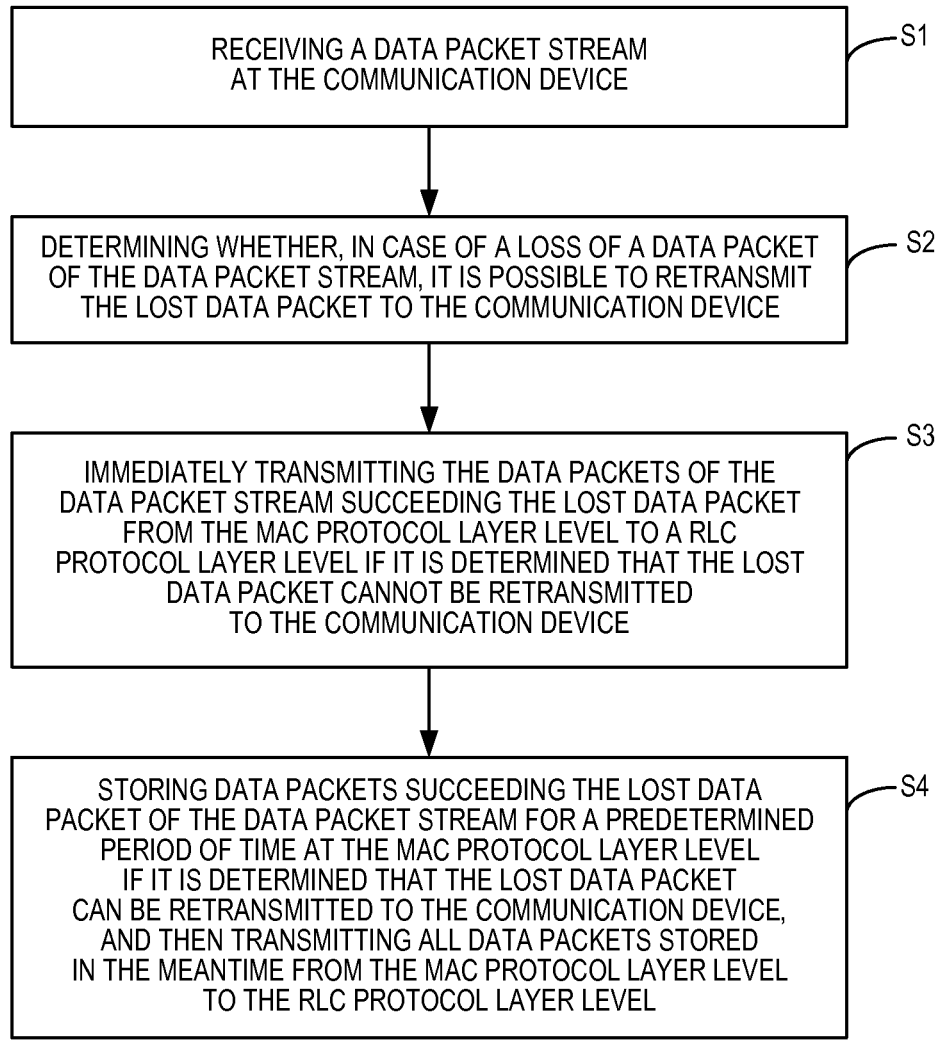
FIG. 2 shows a schematic flow chart illustrating a method according to an aspect of the present invention.

Using the communication device 10, the following method of handling a data packet stream 22 at different communication protocol layer levels of the communication protocol layer stack 12 may be carried out, as shown in FIG. 2. At S1, the data packet stream 22 is received at the communication device 10. At S2, in the event of a loss of a data packet of the data packet stream 22, it is determined whether it is possible to retransmit the lost data packet to the communication device 10. At S3, if it is determined that the lost data packet cannot be retransmitted to the communication device 10, data packets of the data packet stream 22 succeeding the lost data packet are immediately transmitted from the MAC protocol layer level to the RLC protocol layer level. On the other hand, at S4, if it is determined that the lost data packet can be retransmitted to the communication device 10 (via the data packet stream 22), the data packets succeeding the lost data packet of the data packet stream 22 may be stored for a predetermined period of time at the MAC protocol layer level, and then all data packets stored in the meantime are transmitted (forwarded) from the MAC protocol layer level to the RLC protocol layer level.

Figure 3A:
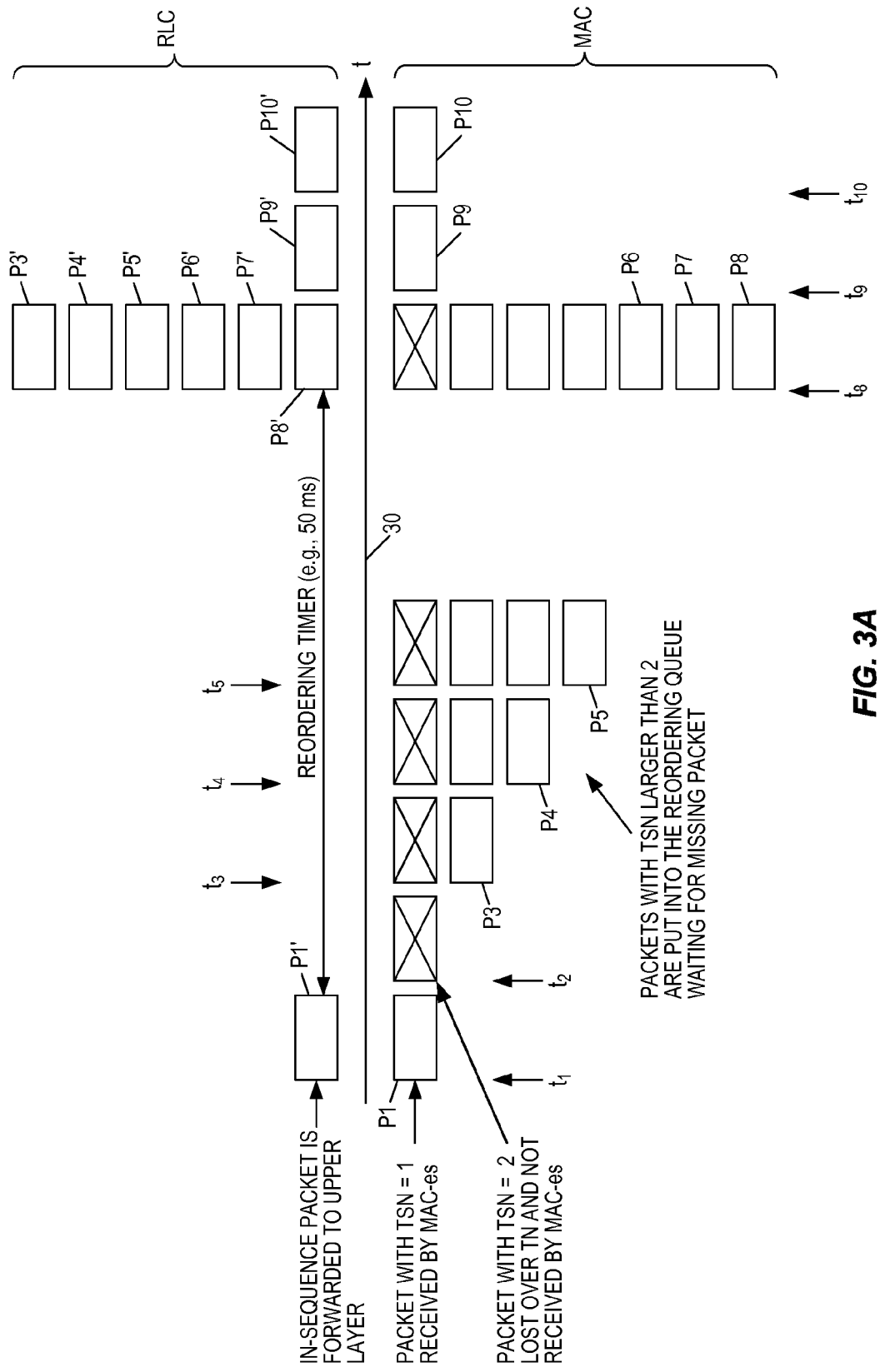
FIGS. 3a, 3b show schematic drawings illustrating a method according to an aspect of the present invention.
Figure 3B:
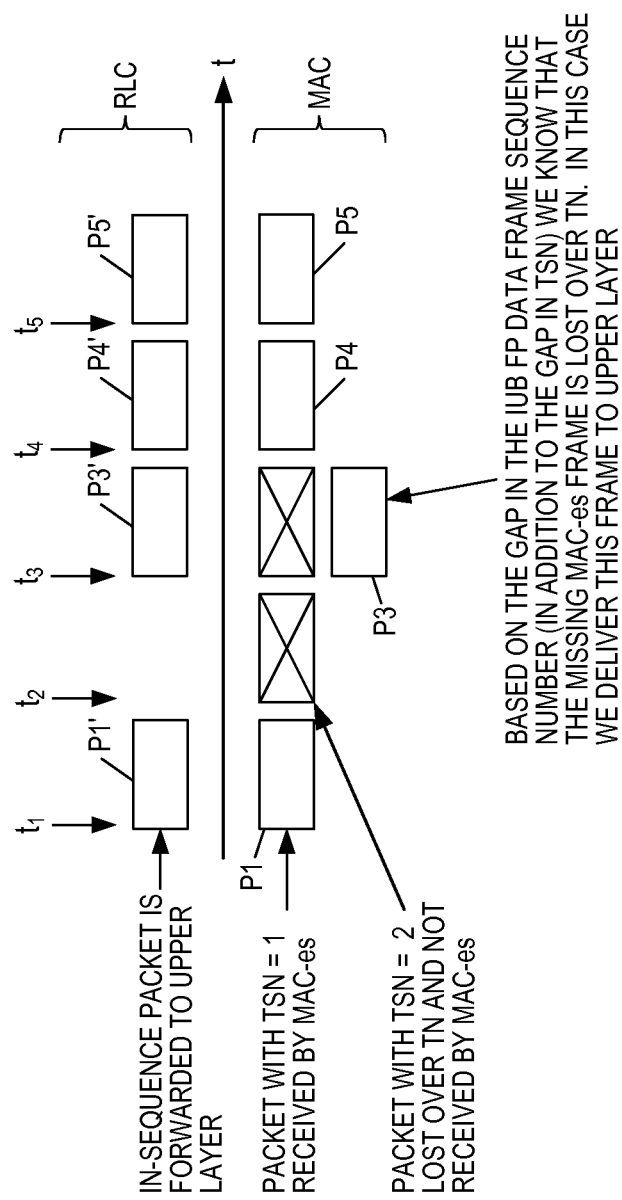

FIGS. 3a and 3b illustrate this communication mechanism in more detail. FIG. 3a illustrates a communication mechanism of current solutions. The data packets below time arrow 30 indicate which data packets are received by the MAC protocol layer 14 at which time instances. The data packets above time arrow 30 indicate which data packets are received by the RLC protocol layer 16 at which time instances. For example, data packet P1 is received at the MAC protocol layer 14 at time instance t1, and is immediately forwarded to the RLC protocol layer 16 (i.e., at time instance t1) in order to be converted into data packet P1'. In contrast, data packet P3 is received at the MAC protocol layer 14 at time instance t3, but is forwarded to RLC protocol layer 16 at time instance t8, together with data packets P4 to P8 which are received by the MAC protocol layer 14 at time instances t4 to t8, respectively. When transmitting data packets P3 to P8 to the RLC protocol layer 16, data packets P3 to P8 are converted into data packets P3' to P8', respectively. Between time instances t2 and t8, data packets P3 to P7 are stored at the level of the MAC protocol layer 14 (using, e.g., a reordering buffer). Converting data packet P1 into data packet P1' for example means that the content (user data (payload data) and control data) of the data packet P1 is encapsulated into a new frame format adapted to the new communication protocol layer (here, the RLC protocol layer 16), thereby obtaining data packet P1'.

In the scenario shown in FIG. 3a, a loss of data packet P2 is detected by the MAC protocol layer 14. In response to the detected loss, for a predetermined period of time, all data packets succeeding lost data packet P2 are stored at the MAC protocol layer 14. The loss of data packet P2 (which should have arrived at time instance t2), which is detected at time instance t3, triggers a timer that waits for a predetermined period of time, starting from time instance t2. In the illustrated example, the predetermined period of time is 50 ms. During this predetermined period of time, all data packets received by the MAC protocol layer 14 in the meantime are stored at the level of the MAC protocol layer 14 (e.g., in a reordering buffer). The purpose of triggering the timer is to wait (a MAC reordering mechanism waits) for a possible retransmission of the lost data packet P2. If the lost data packet P2 is retransmitted during the predetermined period of time, it is transmitted, together with data packets P3 to P8, at time instance t8 (at which time the timer expires) from the MAC protocol layer 14 to the RLC protocol layer 16. If the lost data packet P2 is not retransmitted during the predetermined period of time to the MAC protocol layer 14, data packets P3 to P8 are transmitted at time instance t8 from the MAC protocol layer 14 to the RLC protocol layer 16 without data packet P2.

The mechanism shown in FIG. 3a is appropriate for handling data packet (data frame) loss over an Uu interface, where a HARQ mechanism is available to retransmit the lost data packet P2. However, the mechanism shown in FIG. 3a is not appropriate in the event of a TN loss (a TN loss is assumed in the scenario shown in FIG. 3a), where no retransmission mechanism is available to retransmit the lost data packet P2. According to conventional mechanisms, in the latter case the MAC reordering mechanism waits for data packet P2 even though there is no chance of retransmitting data packet P2.

In order to avoid the drawback of the mechanism shown in FIG. 3a, the mechanism shown in FIG. 3b may be applied. In the scenario shown in FIG. 3b, it is assumed that the data packet P2 has been lost over the Transport Network TN. The loss of data packet P2 is detected by the MAC protocol layer 14. In contrast to the scenario shown in FIG. 3a, all data packets succeeding the lost data packet P2 are not accumulated at the MAC protocol layer 14 during a predetermined period of time, but are immediately (as soon as possible) forwarded to the RLC protocol layer 16. For example, data packet P3 which is received at the MAC protocol layer 14 at time instance t3 is immediately transmitted at time instance t3 to the RLC protocol layer 16, data packet P4 which is received at the MAC protocol layer 14 at time instance t4 is immediately transmitted at time instance t4 to the RLC protocol layer 16, etc.

In the scenario shown in FIG. 3a, the timer is used (triggered) since it is assumed that that data packet P2 will possibly be retransmitted during the predetermined period of time. However, in the scenario shown in FIG. 3b, the timer is not used (triggered) since it is known (due to the fact that a TN loss has occurred) that it is not possible that data packet P2 will be retransmitted. In this way, the performance of the communication protocol layer stack is increased.

In order to determine whether a TN loss has occurred, the following approach may be used: It is determined at time instance t1 that the Transmission Sequence Number ("TSN") of data packet P1 is 1. At time instance t3, it is determined that that the TSN of data packet P3 is 3. Thus, it is determined that no data packet having the TSN=2 has been received. Thus, a gap in the TSNs in the data packets of the data packet stream is detected at the MAC protocol layer level. In addition, at time instance t3, it is determined whether there is a gap in sequence numbers of the data packets of the data packet stream at a Iub FP protocol layer level of the communication protocol layer stack (the Iub FP protocol layer is located below the MAC protocol layer), i.e., whether there is a gap in gap in Iub FP data packet sequence numbers. If these two conditions are fulfilled, a TN loss has occurred, i.e., data packet P2 has been lost over the Transport Network.

Figure 4A:
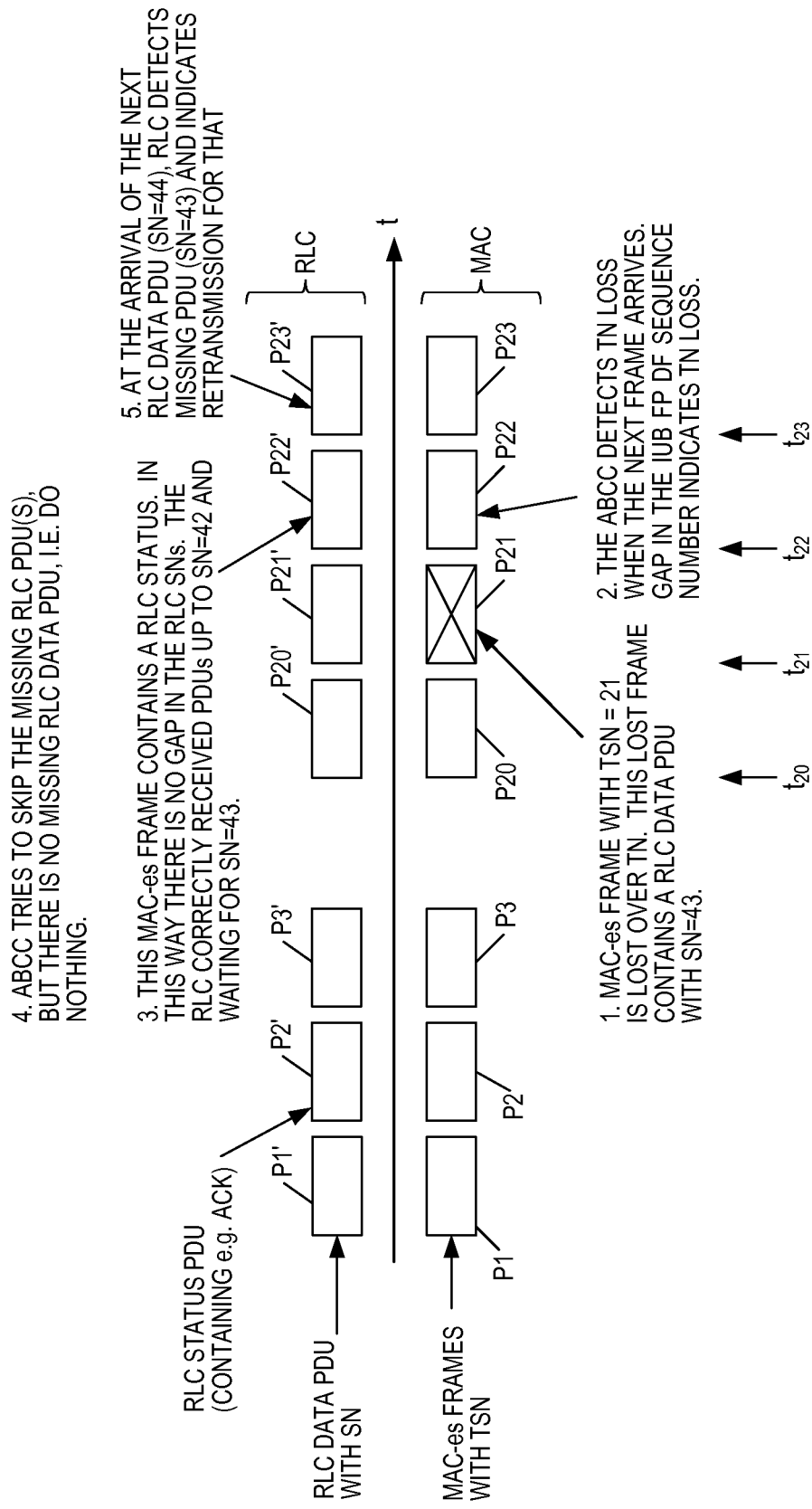
FIGS. 4a, 4b show schematic drawings illustrating a method according to an aspect of the present invention.

In the scenario shown in FIG. 4a, a TN loss of a data packet P21 with TSN=21 is detected by the MAC protocol layer 14 by detecting a TSN gap between data packet P20 with TSN=20 and data packet P22 with TSN=22, and by detecting, at the Iub FP protocol layer level, a corresponding gap in the Iub FP data packet sequence numbers as described in conjunction with FIG. 3b. It is assumed that each of data packets P20, P22 and P23 are immediately (as soon as possible) transmitted from the MAC protocol layer 14 to the RLC protocol layer 16 after they have been received at the MAC protocol layer 14. In this way, data packet P20 is converted into data packet P20', data packet P22 is converted into data packet P22', and data packet P23 is converted into data packet P23' at the RLC protocol layer 16. Since no data packet P21 exists at the MAC protocol layer level, no data packet P21' is created at the RLC protocol layer level. It is assumed that data packet P20' is a RLC DATA packet data unit (PDU), i.e., that data packet P20' comprises RLC payload data, and that the RLC DATA PDU has a sequence number SN=42, that data packet P23 comprises a RLC DATA PDU having a sequence number SN=44, and that that data packet P22' only comprises a RLC STATUS message (i.e., data packet P22' comprises no RLC DATA PDU, i.e., no RLC payload data).

Since data packet P22' only comprises a RLC STATUS message, i.e., does not comprise a RLC DATA PDU, data packet P22' also does not have a RLC Sequence Number. As a consequence, an ABCC mechanism responsible for carrying out the congestion action is not able to detect a gap in RLC Sequence Numbers and thus no gap in RLC DATA PDUs. However, in order to carry out the congestion action, the ABCC mechanism needs to detect a gap in RLC DATA PDUs. Thus, the following scenario occurs: as soon as the MAC protocol layer 14 detects a loss of a data packet (at time instance t22), it instructs the RLC protocol layer 16, i.e., the ABCC mechanism, to carry out a congestion action, e.g., to skip the missing data packet. However, the ABCC mechanism is not able to carry out the congestion action since there is no RLC DATA PDU to skip at time instance t22 (due to the lack of a gap in sequence numbers of RLC DATA PDUs at the RLC protocol layer level at time instance t22). That is, even if a congestion action is demanded by the MAC protocol layer 14, it cannot be executed at the RLC protocol layer 16. Thus, computational resources are unnecessarily wasted (by trying to skip a RLC DATA PDU). This is particularly true if the congestion control is an AQM-based congestion control. On the other hand, at time instance t23, data packet P23' is received at the RLC protocol layer level. At this time instance, the RLC protocol layer 16 (the ABCC mechanism) is able to detect the gap in the RLC Sequence Numbers since data packet P23' comprises a RLC DATA PDU which makes it possible to trigger the congestion event.

Figure 4B:
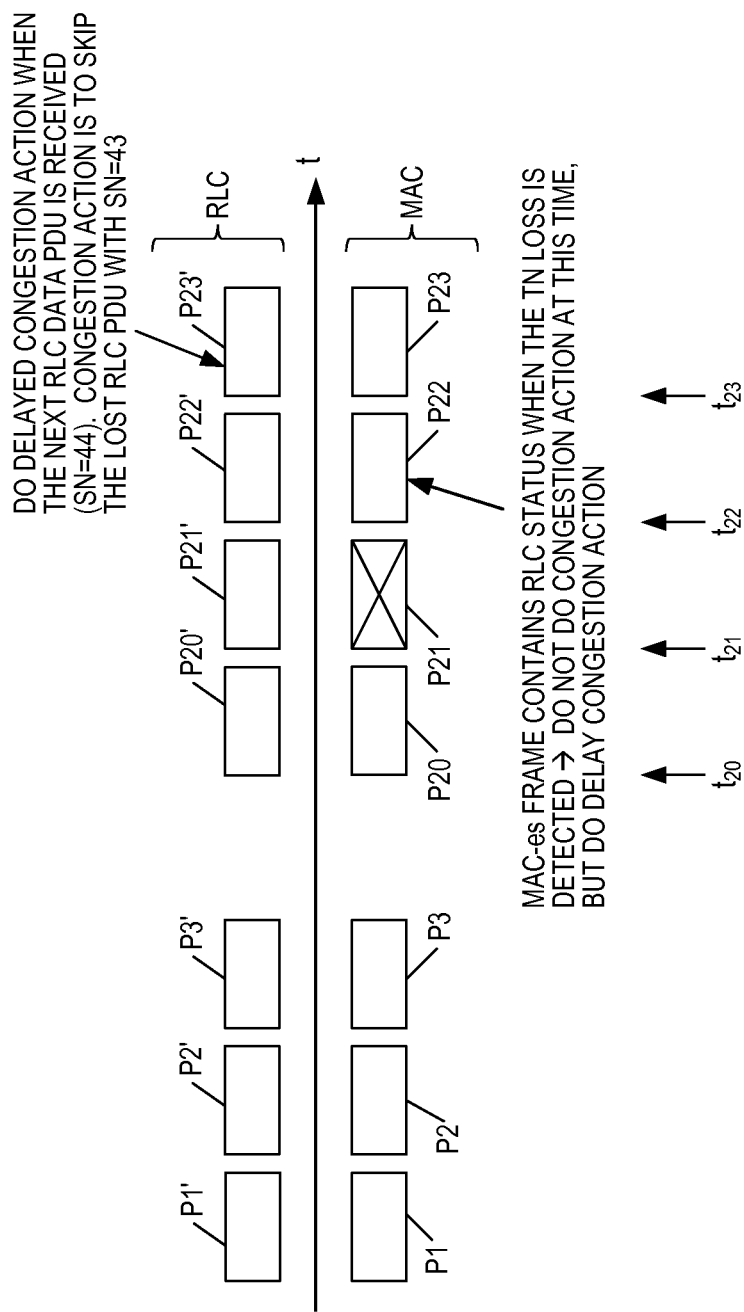

In the scenario shown in FIG. 4b, this disadvantage is avoided since the MAC protocol layer 14 does not demand a congestion action at time t22, but at time instance t23. In this case, it is possible to trigger the congestion event. That is, the MAC protocol layer 14 determines, after having detected a TN loss at time instance t22, whether the data packet P22 immediately succeeding the lost data packet P21 includes only a RLC STATUS message. In this case, the MAC protocol layer 14 waits until data packet P23 including a RLC DATA PDU is received at time instance t23. Then, the MAC protocol layer 14 initiates the RLC protocol layer 16 to carry out the congestion action, e.g., to skip data packet P21'. In this scenario, determining whether data packet P22 immediately succeeding the lost data packet P21 includes only a RLC STATUS message is done at the MAC layer level, and also determining whether data packet P23 including a RLC DATA PDU is received is done at the MAC layer level. In this scenario, a possible congestion action is to skip the lost data packet at the RLC layer level. In this way, it can be ensured that the congestion action at the RLC layer level works properly.

In other words, when a MAC-es frame right after a frame lost over TN contains only RLC ACK, then an AQM-based congestion control is not able to take real congestion action (i.e., it tries to drop an application level IP packet, but there is no available packet to drop; as a consequence, computational resource are unnecessarily wasted while trying to drop the data packet). Since the congestion action cannot be carried out, there is unnecessary RLC AM retransmission (and in this way increased delay), see FIG. 4a.

This disadvantage can be avoided if the MAC protocol layer 14 waits for the next Iub FP data frame, and demands congestion action upon reception of the next Iub FP data frame instead of demanding immediate congestion action, i.e., if the MAC protocol layer 14 waits until the arrival of the next MAC-es frame containing RLC DATA PDU, see FIG. 4b.

Figure 5A:
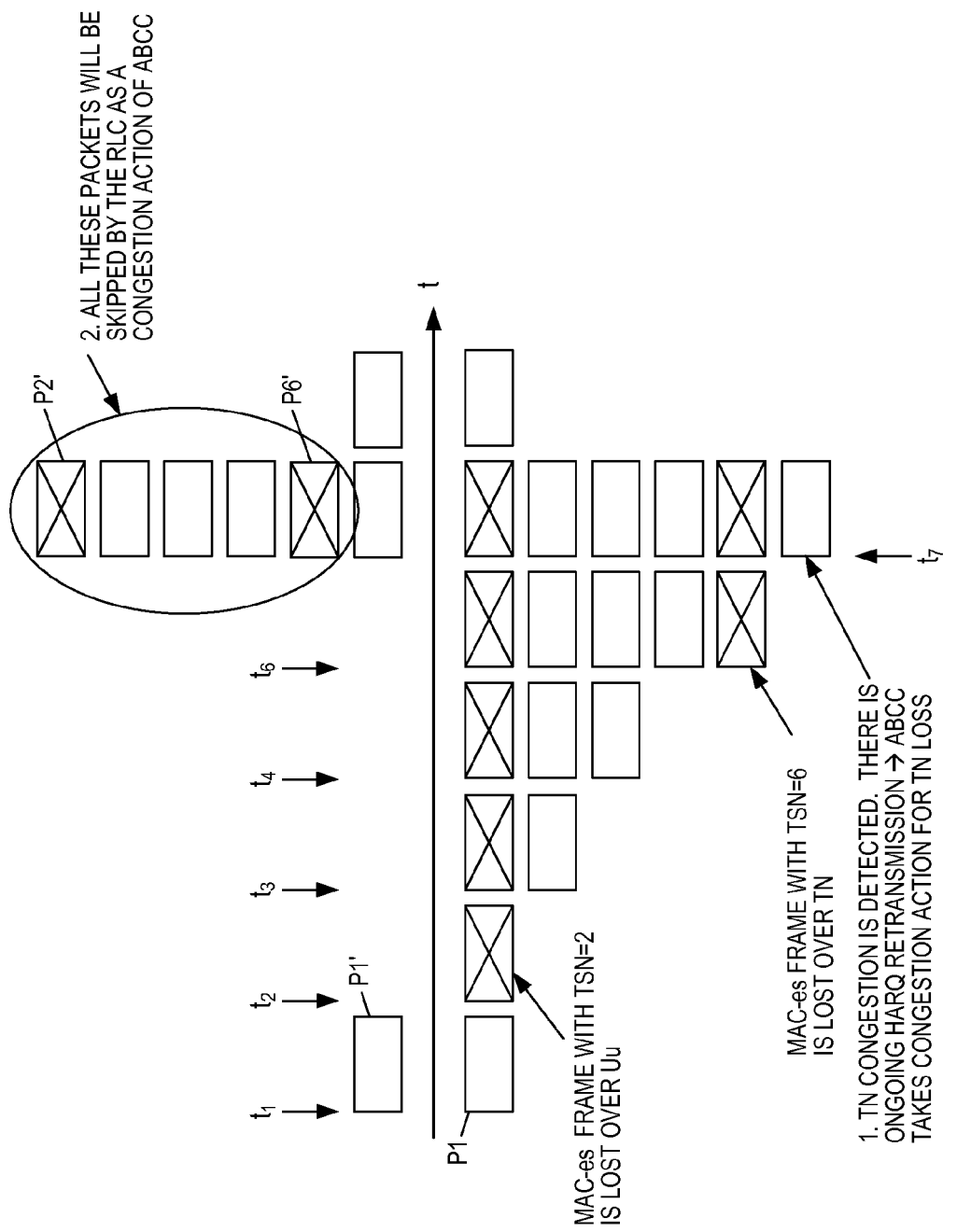
FIGS. 5a, 5b show schematic drawings illustrating a method according to an aspect of the present invention.

When determining that a lost data packet cannot be retransmitted (e.g., in case of a TN loss), there may be an already ongoing retransmission process of a lost data packet which can be retransmitted to the communication device. Should this be the case, the following scenario may happen which is illustrated in FIG. 5a: At time instance t3, it is detected by the MAC protocol layer 14, as described in conjunction with FIG. 3a, that a TN loss has occurred, i.e., that data packet P2 has been lost. As a consequence, as described in the context of FIG. 3a, a timer is triggered, and all data packets succeeding data packet P2 are stored at a MAC protocol layer level. In the meantime, the initiation of a retransmission of the lost data packet P2 is tried, using a Hybrid Automatic Repeat Request ("HARQ") retransmission mechanism. At time instance t7, a further TN loss of a data packet (data packet P6) is detected. Thus, at this time instance, a congestion action is initiated by the MAC protocol layer 14 (in this example a skip action), the data packets P3 to P5 are transmitted to the RLC protocol layer 16, and it is asked to move the RLC window (e.g., a lower edge of a transmitting window of the RLC communication protocol layer is moved). Since, however, at the time of the detection of the loss of data packet P6, the retransmission process of data packet P2 is already going on, the ABCC mechanism will not wait for the result of the retransmission process of data packet P2, but will skip the data packets P2' to P6' at the RLC protocol layer level (i.e., not transmit data packets P2' to P6' to higher protocol layers) due to the standard architecture of the ABCC mechanism.

Figure 5B:
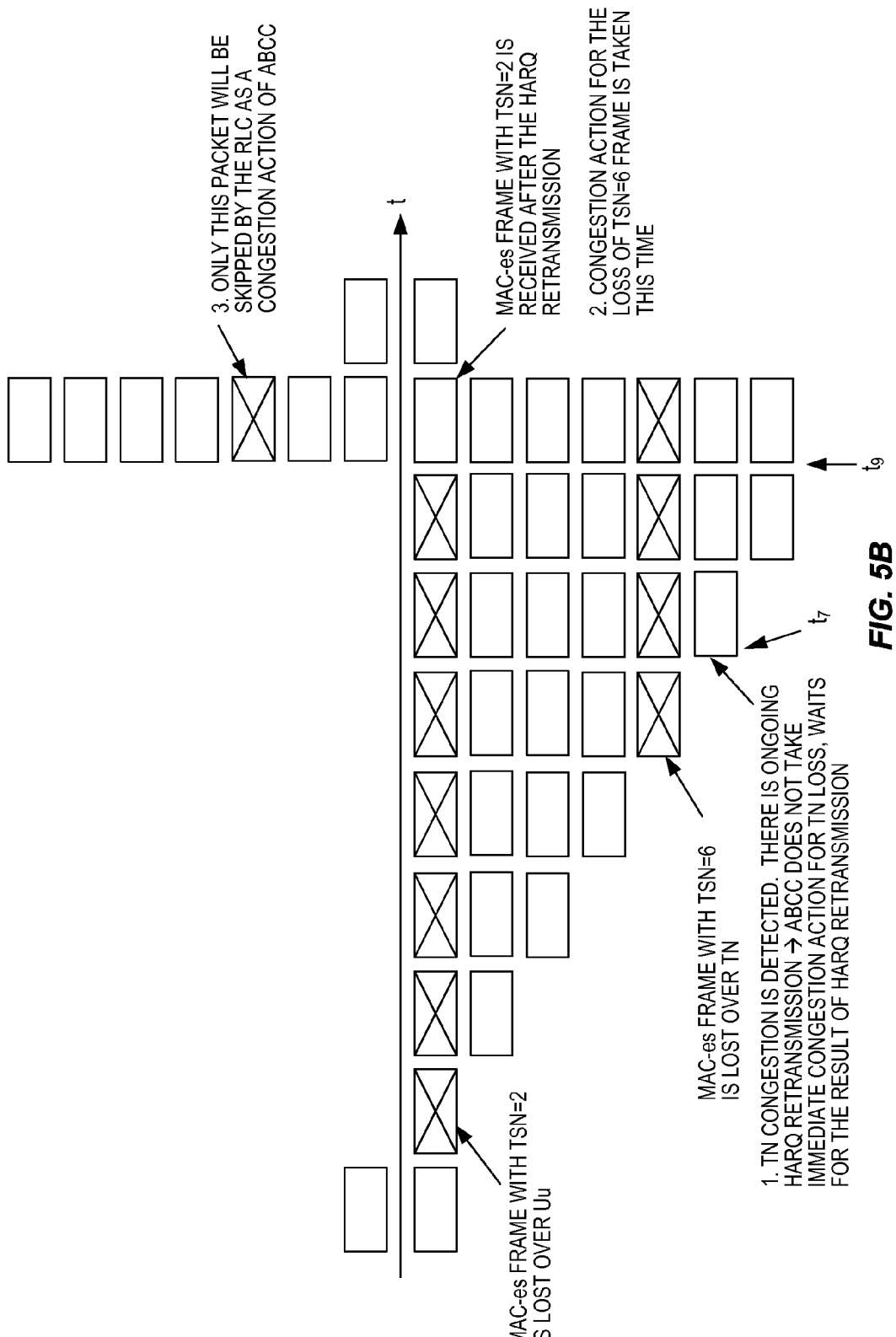

In order to avoid this disadvantage, the following approach can be chosen, as shown in FIG. 5b. In FIG. 5b, at time instance t7, when the loss of data packet P6 is detected, no immediate congestion action is initiated by the MAC protocol layer 14. Instead, the MAC protocol layer 14 waits to determine what the outcome of the retransmission process of data packet P2 is. In the example, as shown in FIG. 5b, the result of the retransmission process of data packet P2 is positive, i.e., the lost data packet P2 is retransmitted at time instance t9. Thus, upon reception of the data packet P2 at time instance t9, the congestion action 8a skip action) is initiated by the MAC protocol layer 14, and the data packets P2 to P5 and P7 to P8 are transmitted from the MAC protocol layer 14 to the RLC protocol layer 16. In this case, due to the standard architecture of the ABCC mechanism, the ABCC mechanism will only skip data packet P6', but not skip data packets P3' to P5', as shown in FIG. 5a. As a result, fewer data packets will be skipped on a RLC protocol layer level, which makes it possible to increase the efficiency of data transmission through the communication protocol layer stack 12.

In all embodiments of the present invention, the MAC layer may for instance be a MAC-es layer. The UMTS device may for instance be a Radio Network Controller ("RNC") device.

Figure 6:
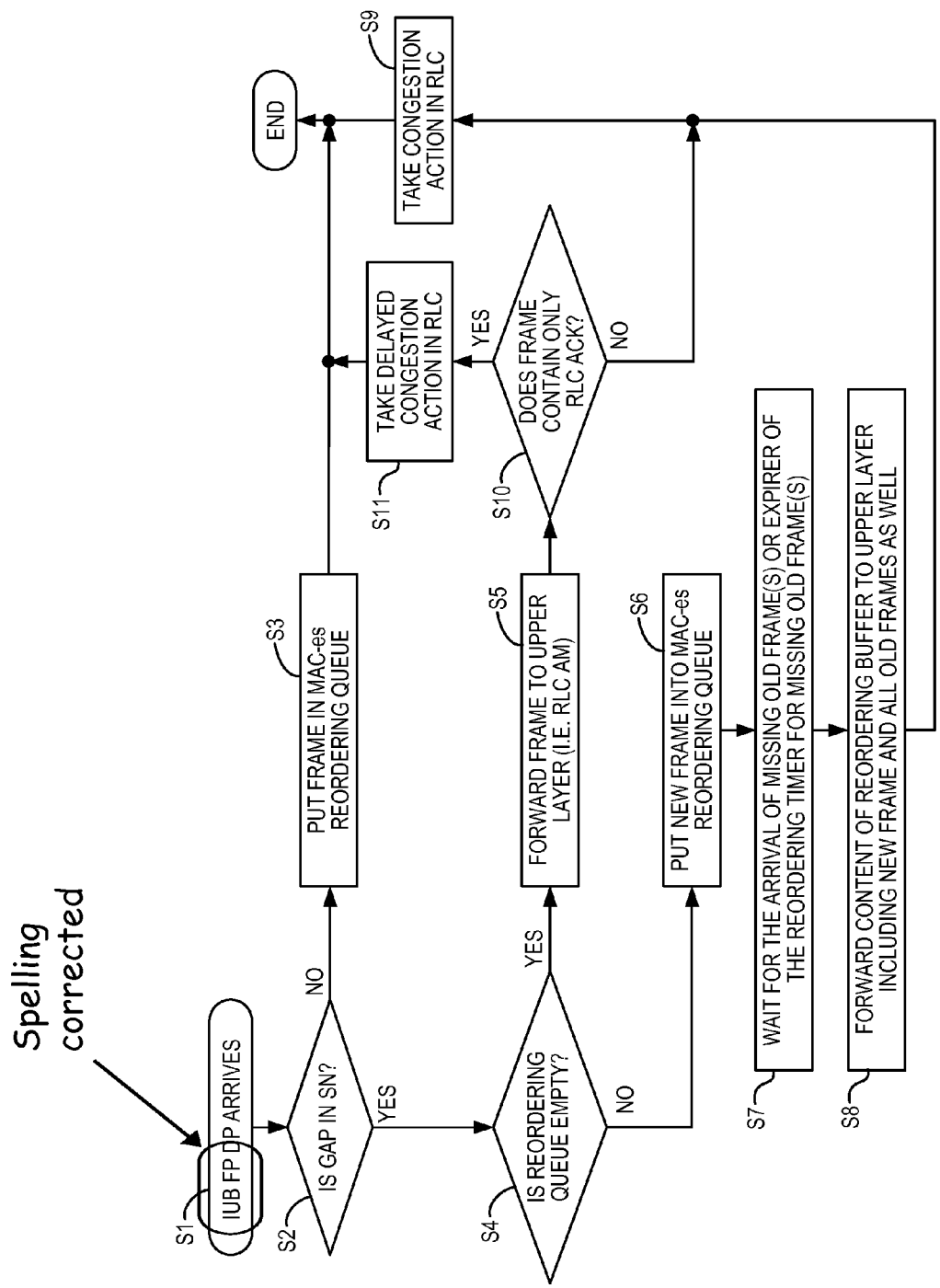
FIG. 6 shows a schematic flow chart illustrating a method according to an aspect of the present invention.

The approaches shown in FIGS. 3b, 4b and 5b may be arbitrarily combined with each other. FIG. 6 shows one way in which the approaches shown in FIGS. 3b, 4b, and 5b may possibly be combined. At S1, it is detected at the MAC protocol layer 14 that a new Iub FP data packet has arrived. At S2, it is determined whether there is a gap in the sequence numbers of the data packets (Iub frame) at the Iub FP protocol layer level and in the sequence numbers of the data packets (MAC frames) at the MAC protocol layer level. If there is no gap in the sequence numbers, then, at S3, the MAC frame is put into a MAC reordering queue. If there is a gap in the sequence numbers, then, at S4, it is determined whether the reordering queue is empty, i.e., whether there are any MAC data frames already stored in the MAC protocol layer (which is a sign that a timer has been triggered due to a previous detected data packet loss). If the reordering queue is empty (no timer has been triggered), then, at S5, the MAC data frame is immediately transmitted to the RLC protocol layer (e.g., to the RLC AM module). If the reordering queue is not empty, then, at S6, the MAC data frame is added to the MAC reordering queue. Then, at S7, the MAC layer 14 waits for the arrival of missing old data frames, i.e., for lost data packets or it is waited for the expiring of a reordering timer for missing old data frames, i.e., for lost data packets. After this, at S8, the content of the reordering buffer is transmitted from the MAC protocol layer 14 to the RLC protocol layer 16. After S8, at S9, a congestion action at the RLC protocol layer 16 is initiated by the MAC protocol layer 14. On the other hand, after S5, at S10, it is determined whether the data frame comprises only a RLC STATUS message. If the data frame comprises only a RLC STATUS message, then, at S11, the congestion action is initiated by the MAC layer 14 with a delay. After S3, S9, and S11, the method is respectively terminated.

In FIG. 6, steps S4 and S5 reflect the embodiment shown in FIG. 3b, steps S7 and S8 reflect the embodiment shown in FIG. 5b, and steps S10 and S11 reflect the embodiment shown in FIG. 4b.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of handling a data packet stream at different communication protocol layer levels of a communication protocol layer stack of an Universal Mobile Telecommunications System (UMTS) communication device, the communication protocol layer stack comprising a Medium Access Control (MAC) protocol layer and a Radio Link Control (RLC) protocol layer, the method comprising:
    receiving the data packet stream at the UMTS communication device;
    determining whether, in the event of a loss of a data packet of the data packet stream, the lost data packet can be retransmitted to the UMTS communication device; and
    transmitting data packets of the data packet stream succeeding the lost data packet from the MAC protocol layer level to the RLC protocol layer level such that a first time period between reception of a succeeding data packet at the MAC protocol layer level and reception of the data packet at the RLC protocol layer level is less than a second time period between two succeeding data packets at the MAC protocol layer if it is determined that the lost data packet cannot be retransmitted to the UMTS communication device, otherwise storing data packets of the data packet stream succeeding the lost data packet for a third period of time at the MAC protocol layer level, wherein the third period of time is longer than the second time period.

2. The method of claim 1, wherein determining whether the lost data packet can be retransmitted to the UMTS communication device is based on determining whether there is a gap in sequence numbers of data packets of the data packet stream at the MAC protocol layer level and based on whether there is also a gap in sequence numbers of the data packets of the data packet stream at a Iub Frame Protocol (FP) protocol layer level of the communication protocol layer stack.

3. The method of claim 1, wherein determining whether the lost data packet can be retransmitted to the UMTS communication device comprises determining that the lost data packet can be retransmitted by determining that there is a gap in sequence numbers of data packets of the data packet stream at the MAC protocol layer level but that there is no gap in sequence numbers of the data packets of the data packet stream at the Tub Frame Protocol (FP) protocol layer level.

4. The method of claim 1, wherein congestion events and congestion actions related to the UMTS communication device are controlled by a AQM-based control mechanism, in particular by an EUL AQM-based control mechanism.

5. The method of claim 1, further comprising:
    determining, after having determined that the lost data packet cannot be retransmitted, whether a data packet immediately succeeding the lost data packet includes only a RLC STATUS message;
    waiting, if the data packet immediately succeeding the lost data packet only includes a RLC STATUS message, until a data packet including RLC payload data is received at the UMTS communication device; and
    triggering a congestion action regarding the lost data packet after having received the data packet including the RLC payload data.

6. The method of claim 5, wherein determining whether a data packet immediately succeeding the lost data packet includes only a RLC STATUS message is done at the MAC layer level, and wherein determining whether a data packet including RLC payload data is received is done at the MAC layer level.

7. The method of claim 5, wherein the congestion action is to skip the lost data packet at the RLC layer level.

8. The method of claim 1, further comprising:
    determining, after having determined that the lost data packet cannot be retransmitted, whether currently a retransmission process of a second lost data packet is being carried out, wherein the second lost data packet can be retransmitted to the UMTS communication device;
    waiting, if it is determined that currently the retransmission process of the second lost data packet is being carried out, until the retransmission process of the second lost data packet has been finished or terminated; and
    triggering a congestion action regarding the lost data packet which cannot be retransmitted after having finished or terminated the retransmission process of the second lost data packet.

9. The method of claim 8, wherein the retransmission process is a Hybrid Automatic Repeat Request (HARQ) retransmission process.

10. The method of claim 8, wherein the congestion action is to skip the lost data packet that cannot be retransmitted at the RLC layer level.

11. The method of claim 1, wherein the MAC layer is a MAC-es layer.

12. A non-transitory computer-readable recording medium comprising stored thereupon a computer program, the computer program comprising program code portions that, when run on an Universal Mobile Telecommunications System (UMTS) communication device adapted to handle a data packet stream at different communication protocol layer levels of a communication protocol layer stack, the communication protocol layer stack comprising a Medium Access Control (MAC) protocol layer and a Radio Link Control (RLC) protocol layer, cause the UMTS communication device to:
    receive the data packet stream at the UMTS communication device;
    determine whether, in the event of a loss of a data packet of the data packet stream, the lost data packet can be retransmitted to the UMTS communication device; and
    transmit data packets of the data packet stream succeeding the lost data packet from the MAC protocol layer level to the RLC protocol layer level such that a first time period between reception of a succeeding data packet at the MAC protocol layer level and reception of the data packet at the RLC protocol layer level is less than a second time period between two succeeding data packets at the MAC protocol layer if it is determined that the lost data packet cannot be retransmitted to the UMTS communication device, otherwise storing data packets of the data packet stream succeeding the lost data packet for a third period of time at the MAC protocol layer level, wherein the third period of time is longer than the second time period.

13. An Universal Mobile Telecommunications System (UMTS) communication device comprising a communication protocol layer stack adapted to handle a data packet stream sent to the UMTS communication device at different communication protocol layer levels, the communication protocol layer stack comprising a Medium Access Control (MAC) protocol layer and a Radio Link Control (RLC) protocol layer, the UMTS communication device comprising:

a receiving circuit adapted to receive a stream of data packets sent to the UMTS communication device;

a determining circuit coupled to the receiving circuit and adapted to determine whether, in case of a loss of a data packet of the data packet stream the lost data packet can be retransmitted to the UMTS communication device, wherein the determining circuit determines that the lost data packet can be retransmitted to the UMTS communication device if there is a gap in sequence numbers of data packets of the data packet stream at the MAC protocol layer level, however no gap in sequence numbers of the data packets of the data packet stream at the Iub Frame Protocol (FP) protocol layer level;

the communication protocol layer stack being adapted to transmit data packets of the data packet stream succeeding the lost data packet from the MAC protocol layer level to the RLC protocol layer level such that a first time period between reception of a succeeding data packet at the MAC protocol layer level and reception of the data packet at the RLC protocol layer level is less than a second time period between two succeeding data packets at the MAC protocol layer if it is determined by the determining circuit that the lost data packet cannot be retransmitted to the UMTS communication device, otherwise to store data packets of the data packet stream succeeding the lost data packet for a third period of time at the MAC protocol layer level, wherein the third period of time is longer than the second time period.

\* \* \* \* \*